United States Patent [19]
Köster et al.

[11] 4,214,476
[45] Jul. 29, 1980

[54] TESTING DEVICE FOR INJECTION PUMPS

[75] Inventors: Claus Köster, Ditzingen; Joachim Siegert, Leonberg; Heinz Nothdurft, Stuttgart, all of Fed. Rep. of Germany

[73] Assignee: Robert Bosch GmbH, Stuttgart, Fed. Rep. of Germany

[21] Appl. No.: 37,453

[22] Filed: May 9, 1979

[30] Foreign Application Priority Data

May 11, 1978 [DE] Fed. Rep. of Germany ....... 2820542

[51] Int. Cl.$^3$ .......................................... G01M 19/00
[52] U.S. Cl. ................................................. 73/119 A
[58] Field of Search ................... 73/119 A, 168, 49.7, 73/346, 349

[56] References Cited

U.S. PATENT DOCUMENTS

| 3,423,998 | 1/1969 | Blomgren, Jr. ............... 73/119 A X |
| 4,134,301 | 1/1979 | Erwin, Jr. ...................... 73/119 A X |

Primary Examiner—Jerry W. Myracle
Attorney, Agent, or Firm—Michael J. Striker

[57] ABSTRACT

The device for testing the nozzles of injection pumps includes a temperature-responsive element arranged in the return-flow conduit of the injection pump and connected to the input of a control device the output of which controls two solenoid-operated 4/2 directional control valves which alternately open or close the feeding port to the intake conduit of the pump under test. The test liquid which is alternately delivered into the intake conduit by means of two delivery pumps from two containers storing the test liquid at different temperatures. When the temperature of the test liquid discharged by the overflow valve in the injection pump exceeds an upper limit (for example 55° C.), the control valve through which the warmer test liquid is supplied is closed and the other valve delivers the cooler test liquid into the injection pump. Similarly, when the temperature of the overflow drops below the limit value, the delivery of the test liquid is switched over to take place from the warmer container. In this manner it is possible to keep the temperature of the test fluid in the injection pump constant and the reproducibility of the injection test is considerably improved.

4 Claims, 1 Drawing Figure

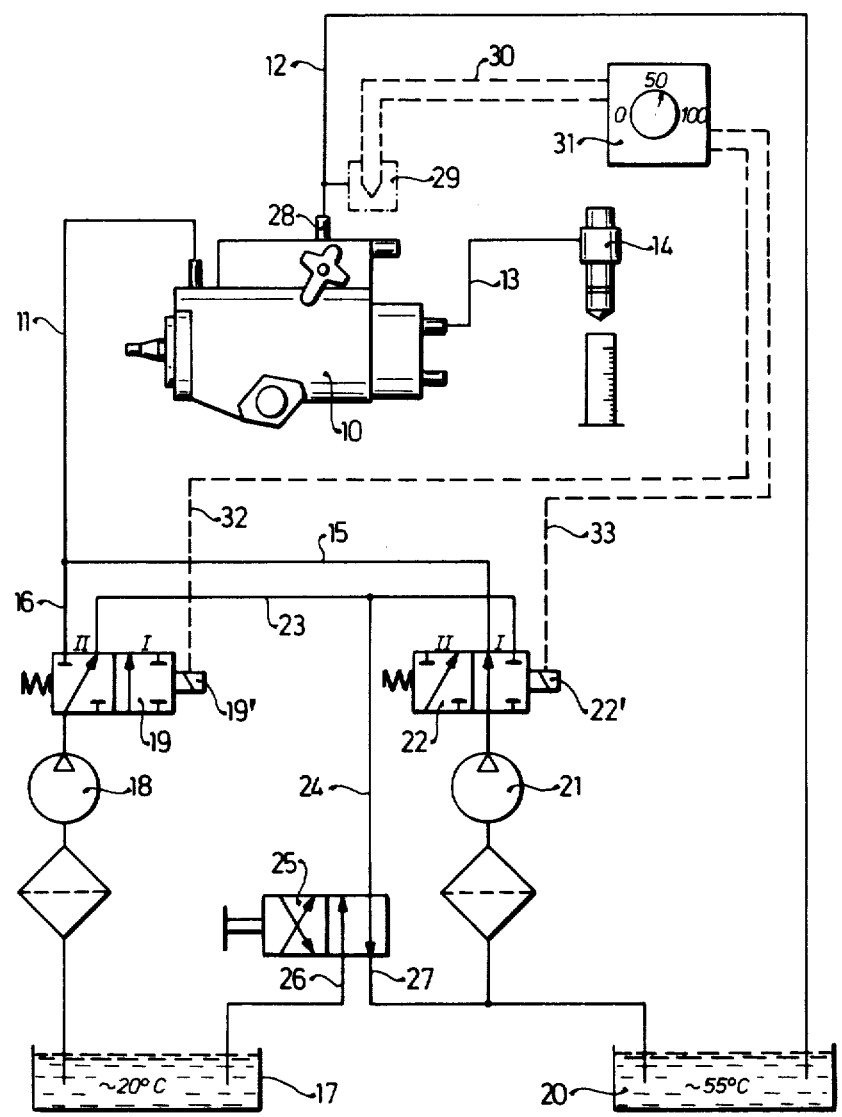

TESTING DEVICE FOR INJECTION PUMPS

BACKGROUND OF THE INVENTION

This invention relates generally to devices for testing the discharge nozzles of injection pumps having an overflow valve, and more particularly it relates to a testing device of the type which delivers a testing fluid such as a testing oil, for example, into the nozzle of the injection pump and measures the overflow fluid discharged through the overflow valve.

In conventional testing devices of this type the testing oil is supplied to the injection pump from a single storing container and discharged through the injection nozzle of the pump. Due to considerable temperature differences between the test oil in the storing container and in the feeding conduit, the testing results are rather inaccurate.

SUMMARY OF THE INVENTION

It is, therefore, a general object of the present invention to overcome the above-mentioned disadvantage.

More particularly, it is an object of the invention to provide an improved testing device for injection pumps in which the temperature of the test fluid is kept substantially constant so that the accuracy of the testing results be improved.

In keeping with these obects, and others which will become apparent hereafter, one feature of the invention resides, in a device for testing injection pumps having a flow-return port with an overflow valve, an intake port and a test port, in a combination which comprises a pair of containers each storing a test liquid at a different temperature, a pair of delivery pumps assigned to the containers, a pair of directional control valves connected for alternately supplying the liquid from respective containers to the intake port of the injection pump under test, a temperature-responsive control device having a temperature measuring element arranged at the outlet of the overflow valve and an output for delivering an actuation signal to switch over the directional control valves.

Preferably, the directional control valves are alternately operated by solenoids in response to output signals generated in the control device upon sensing a predetermined temperature limit of the return flow of the test liquid. The discharge ports of the directional control valves are connected to the common intake port of the injection pump under test and in addition, the discharge ports opened in the other switching position of the directional control valves are connected via a common branch conduit to one of the storing containers. A hand-operated additional control valve enables the selection of the container into which the discharge flow of the disconnected delivery pump is returned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates a schematic diagram of the testing device for an injection pump according to this invention.

DESCRIPTION OF A PREFERRED EMBODIMENT

A distributing injection pump 10 includes an intake conduit 11 connected to an intake port of the pump 10, a return-flow conduit 12 connected to an overflow valve 28 and a test conduit 13 connected to the discharge port of the pump and delivering the test oil to the nozzle 14 under test. The intake conduit 11 branches into a first intake branch 15 and a second intake branch 16. The intake branch 15 is connected to a discharge port AI of a 2/2 direction control valve 22 and the intake branch 16 connects to the discharge port AII of a similar directional control valve 19. The valves 19 and 22 are operated by solenoids 19' and 22'. A return-flow conduit 24 is connected via a branch conduit 23 to the other discharge ports BII and BI of the directional control valves 19 and 22 and returns the test liquid discharged from the disconnected delivery pump 18 or 21 into one of the containers 17 or 20. In the position of the switching valve 25 as illustrated in the FIGURE, the fluid discharged from pump 18 is returned via conduits 23, 24 and 27 into the container 20.

The solenoid-operated directional control valves 19 and 22 are alternately operated so that when one is in a switching position in which the test oil is supplied into the injection pump 10, the other directional control valve is in a position in which it connects the discharge port of the assigned delivery pump via the return flow conduit 24 and the manually operated switching valve 25 into one of the containers. The liquid in container 17 has a temperature of about 20° C., for example, whereas in the other container 20 is at a temperature of about 65° C. Provided that control valve 19 is switched over into position I, then the other control valve 22 is simultaneously displaced into its position II. As a result of this switch over, the test oil delivered by the delivery pump 18 flows via the second intake branch 16 and the intake conduit 11 into the injection pump 10 which discharges the liquid through the nozzle 14 under test. Inasmuch as the pump 18 delivers always more test oil than is discharged through the nozzle 14, the excessive test oil is discharged through the overflow valve 28 and the flow-return conduit 12 into the container 20. Downstream of the overflow valve 28 a temperature measuring element 29 is arranged in the return conduit 12 and electrically connected to the input of a temperature responsive control device 31. The output of the device 31 generates a control signal in response to a predetermined level of the detected temperature and this output signal is applied via electrical conduits 32 and 33 to solenoids 19' and 22' of the valves 19 and 22. The test liquid warms up when passing through the injection pump 10 and the increased temperature measured by the element 29 determines the actuation of one of the two solenoids. As mentioned above, the control valve 22 has been switched over into the position II in which the pressure fluid delivered by the delivery pump 21 is returned via conduits 23 and 24 and via switching valves 25 and the conduit 27 into the container 20. If the directional control valve 22 is in its switching position I, then the other control valve 19 is in the switching position II and the delivery pump 21 supplies the test liquid to the intake of the injection pump 10, whereas the test liquid delivered by the other pump 18 is returned via conduits 24 and 27 into the container 20.

If the overflow test liquid in the return conduit 12 reaches a threshold temperature of about 55° C., then temperature measuring element 29 delivers a trigger signal to the control device 31 which in turn generates at its output an actuation signal. Provided that the control valves 19 and 22 are in the switching position as illustrated in the drawing, the actuation signal from the device 31 causes the switch over of the two valves so that the control valve 22 is in its position II and the other control valve 19 is in its switching position I. As a consequence, the delivery pump 18 starts supplying the test liquid of lower temperature from the container 17 to the intake port of the injection pump 10.

As soon as the temperature measuring element detects a temperature slightly below the 55° C., the control device 31 generates again at its output an actuation signal which energizes the solenoids 19' and 22' to switch over the valves 19 and 22 into a switching position in which the test oil from the container 20 having a higher temperature is delivered by the pump 21 into the injection pump 10.

By means of the hand-operated directional control valve 25 it is possible to selectively return the discharged fluid from the disconnected one of the delivery pumps 18 and 21 either into the container 17 or into the container 20.

By virtue of the alternating delivery of the test oil from two containers having different temperature, it is now possible to minimize the time delay and the time period necessary for equalizing the temperature of the test fluid. In this manner, it is now possible to hold the temperature of the overflow liquid at about ±1° C.

It will be understood that each of the elements described above, or two or more together, may also find a useful application in other types of constructions differing from the types described above.

While the invention has been illustrated and described as embodied in a device for testing injection pumps, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for testing injection pumps having a flow-return port with an overflow valve, an intake port and a test port, comprising a pair of containers for storing respectively a test liquid at different temperatures; a pair of delivery pumps assigned to said containers; a pair of directional control valves connected for alternately supplying the liquid from said containers to said intake port; and a control device having a temperature measuring input element arranged at the outlet of said overflow valve and an output conduit for delivering an actuation signal to said directional control valves for switching over their portions and thus changing the temperature of the supplied test liquid.

2. The device as defined in claim 1, wherein each of said directional control valves is a two-position valve having a plurality of discharge ports, the discharge port for one position in one of said valves being interconnected with the discharge port for the other position and the remaining discharge port being connected via an auxiliary flow-return conduit to one of said containers.

3. The device as defined in claim 2, wherein said auxiliary flow-return conduit is connected to the intake port of an additional control valve having two outlet ports connected to respective containers.

4. The device as defined in claim 1, wherein said pair of directional control valves are solenoid-operated valves and said control device has an electrical output connected to said solenoid.

* * * * *